Jan. 18, 1927.

E. H. PALMER 1,615,132

CHASSIS MOUNTING

Filed Feb. 20, 1926    2 Sheets-Sheet 1

Elias H. Palmer
INVENTOR

BY Victor J. Evans
ATTORNEY

WITNESS

Jan. 18, 1927.  
E. H. PALMER  
CHASSIS MOUNTING  
Filed Feb. 20, 1926
1,615,132
2 Sheets-Sheet 2
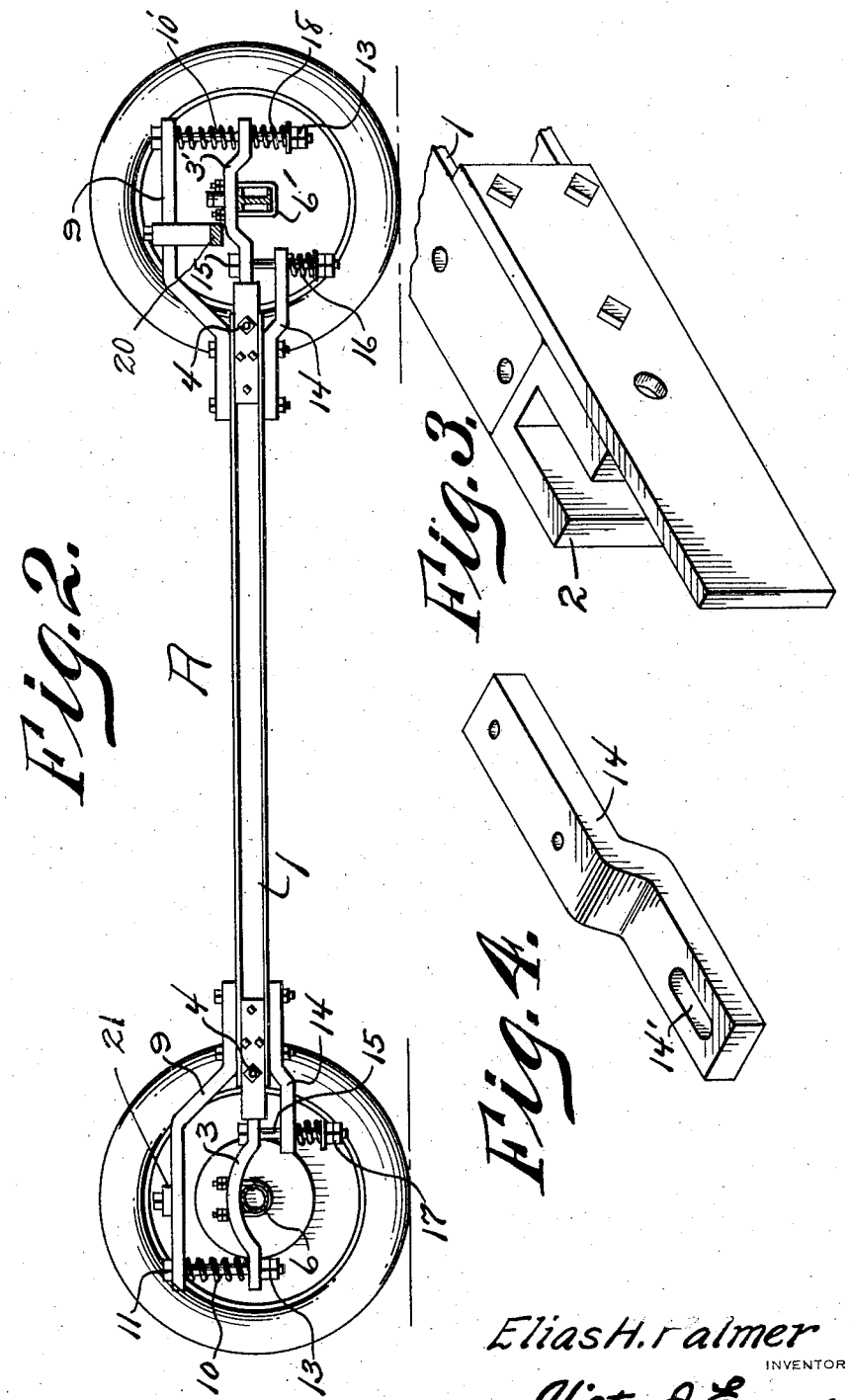
Elias H. Palmer  
INVENTOR  
BY Victor J. Evans  
ATTORNEY
WITNESS Patented Jan. 18, 1927.

1,615,132

UNITED STATES PATENT OFFICE.

ELIAS H. PALMER, OF CHARLESTON, SOUTH CAROLINA.

CHASSIS MOUNTING.

Application filed February 20, 1926. Serial No. 89,710.

This invention relates to a novel mounting of a chassis or truck on the axles, the general object of the invention being to hingedly connect the axle carrying parts to the frame of the chassis or truck and to provide coil springs for resisting the movement of the hinged parts, the lower springs absorbing all shocks incident to the travel of the vehicle over the road or track and the upper springs acting to support the weight of the body and the load.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a section on line 2—2 of Figure 1.

Figure 3 is a perspective view of one corner of the chassis.

Figure 4 is a perspective view of one of the lower arms for engaging a lower spring.

Figure 1:
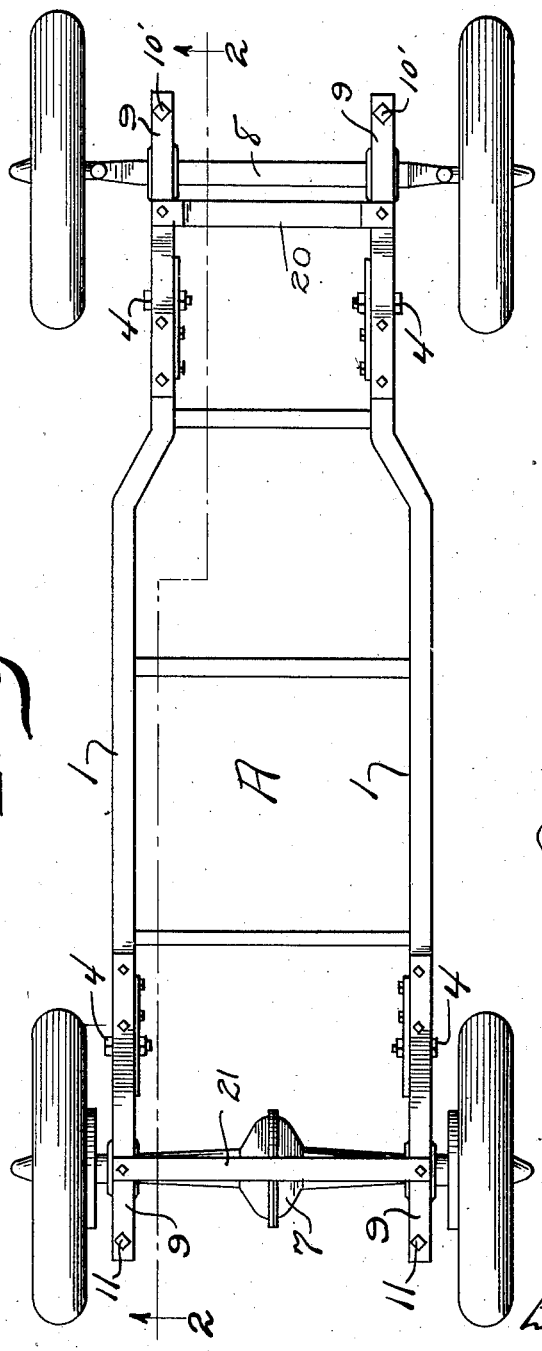
Figure 1 is a plan view showing the invention applied to the chassis of a motor vehicle.
Figure 5:
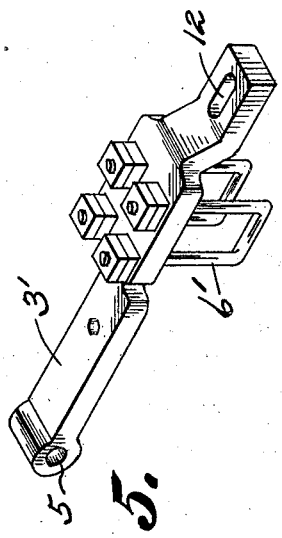
Figure 5 is a view of one of the axle carrying members.

As shown in these views, each side bar 1 of the chassis A has a fork 2 at each end thereof between the prongs of which an extension 3 or 3' is pivoted by means of the bolt 4, this bolt passing through the prongs and through an eye 5 formed at the inner end of the extension 3 or 3', the front extension 3' being slightly different from the rear extension 3. Each extension is provided with the U bolts 6 or 6', the U bolts 6 of the rear extensions supporting the rear axle assembly 7, while those 6' of the front extensions support the front axle 8. Thus the axle carrying extensions are hingedly secured to the chassis frame so that they can move about a horizontal axis. An arm 9 is bolted to each end of each side bar 1 and has an offset portion so that its outer end is spaced above the extension 3 or 3'. A coil spring 10 is placed between the extremities of the arm and extension and is held in place by the bolt 11 which passes through the spring and through the arm and a slot 12 formed in the extension. Nuts 13 on the bolt hold the parts in position and act as means for adjusting the tension of the spring. An arm 14 is bolted to the lower face of the side bar 1 at each end thereof, and the outer end of this arm is provided with a slot 14 through which passes a bolt 15 which is carried by the extension 3 or 3' between its pivotal point and the axle supporting means. A coil spring 16 is arranged on the bolt between the arm 13 and the nuts 17 on the lower end of the bolt.

The arrangement of the front of the chassis is the same as that of the rear, except that an additional coil spring 18 is placed on the bolt 10' which is made longer than the bolt 10, between the lower face of the extension and the nuts on the bolt.

From the foregoing, it will be seen that the axles are hingedly connected with the frame, but movement of the axle carrying parts is resisted by the coil springs, each axle acting as a fulcrum for the suspended weight of the body and the heavier the load resting on the upper spring, the less the strain on the frame at the joint as the extensions act as levers on the axles. The axles are practically floating ones, with the lower springs acting to absorb shocks incident to travel, while the upper springs take the weight of the body and the load. This arrangement will neutralize all shocks and practically eliminate side sway. The springs 18 at the front of the vehicle take care of the rebound of the springs 10' after a severe jolt. This additional spring is not necessary at the rear of the vehicle though it could be used, if desired.

The front arms 9 are connected together by the cross piece 20 which is of yoke shape and is arranged to hold the front end of the motor of the vehicle. The rear arms 9 are connected together by the cross piece 21.

While the drawings show the device applied to the chassis of a motor vehicle, the arrangement could be supplied to the trucks of railroad rolling stock and the like with but slight change and it may also be applied to roller skates.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the supporting frame of a vehicle, an extension hinged to each end of each side member of the frame so that the extension is moved about a horizontal axis, means for connecting a rear axle to the rear extensions, means for connecting a front axle to the front extensions, an extension arm connected to the upper side of each end of each side member, a coil spring located between said extension arm and the extension, means for supporting the spring, an extension arm connected to the under side of each side member at each end thereof, a bolt passing through the extension and said second mentioned extension arm, a spring on the bolt engaging the second mentioned extension arm and nuts on the bolt for holding the last mentioned spring thereon.

2. In combination with a vehicle and its axle, a pair of members connected with the axle and hingedly connected with the supporting frame of the vehicle, an arm connected with each side member of the supporting frame, and extending forwardly over the axle carrying member, a bolt passing through the arm and through said member, a spring on the bolt arranged between the member and the arm, a nut on the bolt under the member, a spring on the bolt between the member and nut, a second arm carried by each side member of the supporting frame and extending under each axle supporting member, a bolt passing through each axle supporting member and through said second mentioned arm, a spring on the second mentioned bolt below the second mentioned arm and a nut for holding the last mentioned spring in position.

In testimony whereof I affix my signature.

ELIAS H. PALMER.